United States Patent Office

2,952,661
Patented Sept. 13, 1960

2,952,661

PHENYL DIESTER OF DIHYDROXY TEREPHTHALIC ACIDS AND VINYLIDENE CHLORIDE POLYMERS STABILIZED THEREWITH

David A. Gordon and Charles W. Hinman, Midland, Mich., assignors to The Dow Chemical Company, Midland, Mich., a corporation of Delaware No Drawing. Filed Aug. 2, 1956, Ser. No. 601,652

7 Claims. (Cl. 260—45.85)

This invention relates to new organic compounds and to polymeric compositions containing the same. More particularly it relates to new organic compounds finding utility as light stabilizers for haloethylene polymers.

Haloethylene polymers, such as those containing at least 50 percent vinylidene chloride, are known to be highly sensitive to the effects of elevated temperatures and of light and under prolonged exposure to heat and light may become so degraded and discolored as to be commercially useless. It has been common practice to blend certain compounds with the polymer to stabilize it against the degradative effects of heat and light. Several of such compounds, however, are highly colored materials which impart an objectionable initial color to the stabilized composition which prevents the production of a commercially saleable white composition. Still other disadvantages of many of the previous compounds are a high odor level and volatility. Any odor in the stabilizer will be transferred to the stabilized composition. When volatile stabilizers are employed the stabilizers volatilize out of the composition leaving the composition in time unprotected against the degradative effects of light, particularly ultra-violet light. In addition all of the compounds vary in their ability to absorb ultra-violet light and it is impossible to predict the effectiveness of any particular compound with any degree of certainty, and even then some of the initially useful compounds wherein the compositions lose some of their effectiveness for absorbing ultra-violet light over a prolonged period of time.

In view of the above problems it would be desirable and it is the principal object of this invention to provide a new group of organic compounds having the stated utility.

It is a further object to provide a group of such compounds which have little or no color and have a low odor level.

Another object is to provide a group of such compounds which have low volatility.

The above and related objects are accomplished by means of a group of certain aryl diesters of dihydroxyterephthalic acid wherein the hydroxyl groups are positioned so that no more than one hydroxyl is in an ortho position to each carboxyl group. The objects are further realized with compositions containing such diesters together with haloethylene polymers.

The useful diesters are those aryl and substituted aryl diesters of both 2,3-dihydroxyterephthalic acid and 2,5-dihydroxyterephthalic acid. The diphenyl esters because of their ease of preparation are preferred compounds. Phenyl esters groups having halogen, hydroxyl, and alkyl groups as nuclear substituents are intended to be included within the scope of the invention however.

The compounds may be prepared from readily available materials using standard laboratory methods. As illustrative of the preparation, the method of preparing diphenyl-2,5-dihydroxyterephthalate will be described.

A quantity of hydroquinone was mixed with an excess of twice the molar amount of anhydrous potassium carbonate in a dry stainless steel bomb. The oxygen was purged with nitrogen and the bomb pressurized with carbon dioxide to 1,200 pounds per square inch at room temperature. The bomb rocker was set in motion and heat applied until a thermal runaway was noted. The runaway usually occurred at about 140° C. to 150° C. and carried the temperature to about 230° C. During this time carbon dioxide was rapidly absorbed and the bomb had to be repressurized. The temperature was maintained at 230° C. until carbon dioxide was no longer absorbed.

After cooling and venting, the contents of the bomb were washed out with water and enough water added to dissolve the reaction product. The solution was filtered, acidified, and the solid 2,5-dihydroxyterephthalic acid collected on a Büchner funnel. The acid was purified further by dissolution in aqueous sodium bicarbonate, filtration, and reprecipitation of the acid with concentrated hydrochloric acid. Analytical samples for proving the structure were obtained by recrystallization from ethanol or n-butanol.

The diphenyl ester was prepared by mixing together the 2,5-dihydroxyterephthalic acid, twice the molar amount of the acid of phenol, and toluene. The mixture was agitated and phosphorus oxychloride added slowly while maintaining the temperature at 100° C. After hydrogen chloride was no longer given off, the mixture was heated at 110° C. for 30 minutes. After cooling, cracked ice was added and the aqueous layer separated and washed once with toluene. The combined toluene fractions were distilled at reduced pressure and the residue taken up in hot ethanol. Upon cooling, a crystalline solid separated. The solid was treated with activated charcoal and recrystallized from butanol. The diphenyl 2,5-dihydroxyterephthalate was in the form of pale yellow crystals melting at 210° C. to 214° C. Diphenyl 2,3-dihydroxyterephthalate prepared in a similar manner using catechol as a starting material was in the form of pale yellow crystals melting at 190° C. to 191° C. Other esters may be prepared similarly by using the appropriately substituted phenol in the esterification.

The diesters of this invention are effective stabilizers for haloethylene polymers, particularly those polymers containing at least 50 percent vinylidene chloride. Such polymers are known to be especially sensitive to the effects of light. The compounds are effective when employed in amounts of from 1 to 10 percent, preferably 1 to 3 percent of the weight of the polymer used in the composition. Compositions containing less than 1 percent exhibit little more stability than unstabilized compositions. No beneficial result accrues from the use of more than 10 percent, and the cost and physical properties, such as strength, of the compositions suffer.

The diesters may be used in polymer compositions containing the common additives such as pigments, fillers, heat stabilizers, and plasticizers. They likewise may be used in combination with other known light stabilizers.

By way of example sample compositions were prepared from 90.5 parts by weight of a copolymer prepared from 85 percent by weight vinylidene chloride and 15 percent by weight of vinyl chloride, 7 parts of a pentaerythritol tetraester (ave. chain length of esterifying acid=6) as a plasticizer, 1 part of an organic epoxide as a heat stabilizer, 0.5 part of an organic lubricant, and 1 part of titanium dioxide as a pigment. One composition was left unstabilized as a blank, while 1 percent by weight of the diesters of this invention was added to the others. The compositions were compression molded into test strips having a thickness of 0.01 inch. The strips were then exposed to direct sunlight in the State of Arizona and examined periodically to determine the degree of discoloration. The results are listed in Table I.

*Table I*

| Stabilizer | Color after exposure (ultra-violet sun hours) | | |
|---|---|---|---|
| | 250 | 500 | 750 |
| None | Brown | Dark brown | Black. |
| Diphenyl 2,3-dihydroxyterephthalate. | Light tan | Brown | Brown. |
| Diphenyl 2,5-dihydroxyterephthalate. | do | Light brown | Do. |

Similar results were obtained when the strips were exposed to ultra-violet sun lamps for up to 21 days.

We claim:
1. As a new organic compound a phenyl diester of a dihydroxy terephthalic acid having the hydroxyl groups positioned so that no more than one hydroxyl is in an ortho position to each carboxyl group.
2. As a new organic compound, diphenyl 2,3-dihydroxyterephthalate characterized by being in the form of pale yellow crystals melting at 190° C. to 191° C.
3. As a new organic compound, diphenyl 2,5-dihydroxyterephthalate characterized by being in the form of pale yellow crystals melting at 210° C. to 214° C.
4. A light stable thermoplastic composition comprising a thermoplastic polymeric material composed of at least 50 percent by weight of vinylidene chloride with a complementary amount of a monoethylenically unsaturated comonomer and from 1 to 8 percent by weight of said polymeric material of a phenyl diester of a dihydroxy terephthalic acid, and said diester having the hydroxyl groups positioned so that no more than 1 hydroxyl is in an ortho position to each carboxyl.
5. The composition claimed in claim 4, wherein said thermoplastic polymeric material is a copolymer of vinylidene chloride and vinyl chloride.
6. The composition claimed in claim 4, wherein said aryl diester is diphenyl 2,3-dihydroxyterephthalate.
7. The composition claimed in claim 4, wherein said aryl diester is diphenyl 2,5-dihydroxyterephthalate.

References Cited in the file of this patent

UNITED STATES PATENTS

| 1,984,283 | Reid et al. | Dec. 11, 1934 |
| 2,157,068 | Carruthers | May 2, 1939 |
| 2,464,250 | Moll et al. | Mar. 15, 1949 |

OTHER REFERENCES

Hantzsch: "Chemical Abstracts," vol. 12 (1918), page 701.

Handbook of Chemistry and Physics (37th ed., 1955–56), published by Chemical Rubber Pub. Co., Cleveland, Ohio, pages 1166 and 1167.